(12) United States Patent
Limberg et al.

(10) Patent No.: US 6,313,882 B1
(45) Date of Patent: Nov. 6, 2001

(54) TV RECEPTION APPARATUS USING SAME GHOST-CANCELLATION CIRCUITRY FOR RECEIVING DIFFERENT TYPES OF TV SIGNALS

(75) Inventors: Allen LeRoy Limberg, Vienna, VA (US); Chandrakant B. Patel, Hopewell, NJ (US)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/217,630

(22) Filed: Dec. 22, 1998

Related U.S. Application Data

(60) Provisional application No. 60/071,288, filed on Jan. 13, 1998, and provisional application No. 60/079,340, filed on Mar. 25, 1998.

(51) Int. Cl.[7] ....................................................... H04N 5/21
(52) U.S. Cl. ............................................ 348/614; 375/350
(58) Field of Search .................................... 348/614, 607, 348/726, 725, 21; 375/235, 348, 350, 323, 349, 346

(56) References Cited

U.S. PATENT DOCUMENTS

| | | | |
|---|---|---|---|
| 5,648,987 | * 7/1997 | Yang et al. | 375/232 |
| 5,673,293 | * 9/1997 | Scarpa et al. | 375/231 |
| 5,912,828 | * 6/1999 | Mondal et al. | 375/232 |
| 6,005,648 | * 12/1999 | Strolle et al. | 348/726 |
| 6,154,505 | * 11/2000 | Konishi et al. | 375/321 |

* cited by examiner

Primary Examiner—Victor R. Kostak
(74) Attorney, Agent, or Firm—Sughrue, Mion, Zinn, Macpeak & Seas, PLLC

(57) ABSTRACT

Television signal reception apparatus for receiving a television signal selected from among transmitted television signals of different types includes a respective receiver portion for each of the different types. Responsive to its respective type of television signal being received, each receiver portion supplies digitized baseband signal to adaptive digital filter circuitry shared by each receiver portion. The adaptive digital filter circuitry is operated for suppressing ghosts in that digitized baseband signal.

22 Claims, 5 Drawing Sheets

TV RECEPTION APPARATUS USING SAME GHOST-CANCELLATION CIRCUITRY FOR RECEIVING DIFFERENT TYPES OF TV SIGNALS

This application is filed under 35 U.S.C. 111 (a) claiming pursuant to 35 U.S.C. 119(e)(1) benefit of the filing date of provisional application serial No. 60/071,288 filed Jan. 13, 1998, and of provisional application serial No. 60/079,340 filed Mar. 25, 1998, which provisional applications were filed pursuant to 35 U.S.C. 111(b).

The invention relates to ghost-cancellation circuitry in television receivers.

BACKGROUND OF THE INVENTION

The visual effects of multipath distortion upon analog television signals can be broadly classified in two categories: multiple images and distortion of the frequency response characteristic of the channel. Both effects occur due to the time and amplitude variations among the multipath signals arriving at the reception site. When the relative delays of the multipath signals with respect to the reference signal are sufficiently large, the visual effect is observed as multiple copies of the same image on the television display displaced horizontally from each other. These copies are sometimes referred to as "macroghosts" to distinguish them from "microghosts", which will be presently described. Macroghosts are more common in over-the-air terrestrial broadcasts than in cablecasting. Long-delay multipath effects, or macroghosts, are typically reduced by cancellation schemes.

In the usual case in which the direct signal predominates and the receiver is synchronized to the direct signal, the ghost images are displaced to the right at varying position, intensity and polarity. These are known as trailing ghosts or "post-ghost" images. Typically, the range for post-ghosts extends to 40 microseconds displacement from the "principal" signal, with 70% or so of post-ghosts occurring in a sub-range that extends to 10 microseconds displacement.

In the less frequently encountered case where the receiver synchronizes to a reflected signal, there will be one or more ghost images displaced to the left of the reference image. These are known as leading ghosts or "pre-ghost" images. Pre-ghosts occurring in off-the-air reception can be displaced as much as 6 microseconds from the "principal" signal, but typically displacements are no more than 2 microseconds.

Multipath signals delayed relatively little with respect to the reference signal do not cause separately discernible copies of the predominant image, but do introduce distortion into the frequency response characteristic of the channel. The visual effect in this case is observed as increased or decreased sharpness of the image and in some cases loss of some image information. These short-delay, close-in or nearby ghosts are commonly caused by unterminated or incorrectly terminated radio-frequency transmission lines such as antenna lead-ins or cable television drop cables. In a cable television environment, it is possible to have multiple close-in ghosts caused by the reflections introduced by having several improperly terminated drop cables of varying lengths. Such multiple close-in ghosts are frequently referred to as "micro-ghosts", and they can accumulate to significant size. Short-delay multipath effects, or microghosts, are typically alleviated by waveform equalization, generally by peaking and/or group-delay compensation of the video frequency response.

In September 1995 the Advanced Television Systems Committee (ATSC) published a standard for digital high-definition television (HDTV) signals that has been accepted as the de facto standard for terrestrial broadcasting of digital television (DTV) signals in the United States of America. The standard will accommodate the transmission of DTV formats other than HDTV formats, such as the parallel transmission of multiple television signals having normal definition comparable to an NTSC analog television signal with high signal-to-noise ratio. The standard uses vestigial-sideband (VSB) amplitude modulation (AM) to transmit the DTV signals, designed for transmission through 6-Mz-bandwidth channels that correspond to channels currently used for analog television transmission.

DTV transmitted by VSB AM during terrestrial broadcasting in the United States of America comprises a succession of consecutive-in-time data fields each containing 313 consecutive-in-time data segments or data lines. Each segment of data is preceded by a data segment synchronization (DSS) code group of four symbols having successive values of +S,–S,–S and +S. The value +S is one level below the maximum positive data excursion, and the value –S is one level above the maximum negative data excursion. The segments of data are each of 77.3 microsecond duration, and there are 832 symbols per data segment for a symbol rate of about 10.76 million bauds or symbols per second. The initial line of each data field is a data field synchronization (DFS) code group that codes a training signal for channel-equalization and multipath suppression procedures. The remaining lines of each data field contain data that have been Reed-Solomon forward error-correction coded. In over-the-air broadcasting the error-correction coded data are then trellis coded using twelve interleaved trellis codes, each a ⅔ rate punctured trellis code with one uncoded bit. Trellis coding results are parsed into three-bit groups for over-the-air transmission in eight-level one-dimensional-constellation symbol coding, which transmission is made without symbol pre-coding separate from the trellis coding procedure. Trellis coding is not used in cablecasting proposed in the ATSC standard. The error-correction coded data are parsed into four-bit groups for transmission as sixteen-level one-dimensional-constellation symbol coding, which transmissions are made without precoding.

The carrier frequency of a VSB DTV signal is 310 kHz above the lower limit frequency of the TV channel. The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 3-bit symbol coding have normalized values of –7, –5, –3, –1, +1, +3, +5 and +7 in the carrier modulating signal exclusive of pilot carrier, the pilot carrier has a normalized value of 1.25. The normalized value of +S is +5, and the normalized value of –S is –5.

Ghosts are a problem in digital television (DTV) transmissions as well as in NTSC analog television transmissions, although the ghosts are not seen as such by the viewer of the image televised by DTV. Instead, the ghosts cause errors in the data-slicing procedures used to convert symbol coding to binary code groups. If these errors are too frequent in nature, the error correction capabilities of the DTV receiver are overwhelmed, and there is catastrophic failure in the television image. If such catastrophic failure occurs infrequently, it can be masked to some extent by freezing the last transmitted good TV images, such masking being less satisfactory if the TV images contain considerable motion content. The catastrophic failure in the television image is accompanied by loss of sound.

The training signal or ghost-cancellation reference (GCR) signal in the initial line of each data field of an ATSC-standard DTV signal is a data field synchronization (DFS) code comprising a 511-sample pseudo-random noise sequence (or "PN sequence") followed by three 63-sample PN sequences. A 511-sample PN sequence is referred to as a "PN511 sequence" and a 63-sample PN sequence is referred to as a "PN63 sequence". The middle ones of the 63-sample PN sequences in the field synchronization codes are transmitted in accordance with a first logic convention in the first line of each odd-numbered data field and in accordance with a second logic convention in the first line of each even-numbered data field, the first and second logic conventions being one's complementary respective to each other.

The middle PN63 sequence of DFS codes, as separated by differentially combining corresponding samples of successive DFS code sequences, can be used as a basis for detecting ghosts. Assuming the final data segments of data fields not to exhibit more than random correlation, pre-ghosts of up to 53.701 microseconds (4+511+63=578 symbol epochs) before the separated middle PN63 sequence can be detected in a discrete Fourier transform (DFT) procedure without have to discriminate against data in the last data segment of the preceding data field. Post-ghosts of up to 17.746 microseconds (63+104+24=191 symbol epochs) after the separated middle PN63 sequence can be detected in a discrete Fourier transform (DFT) procedure without have to discriminate against data in the precode and in the data segment of the succeeding data field.

Allowed U.S. patent application Ser. No. 08/614,471 filed Mar. 13, 1996, by C. B. Patel and A. L. R. Limberg, entitled "RADIO RECEIVERS FOR RECEIVING BOTH VSB AND QAM DIGITAL HDTV SIGNALS", and incorporated herein by reference describes receivers for receiving either VSB signals as used in terrestrial over-the-air broadcasting of DTV or quadrature-amplitude-modulation (QAM) signals they can be used in cablecasting of DTV. When VSB signals are received by a receiver as described in patent application Ser. No. 08/614,471, the direct component that accompanies baseband VSB signals recovered by synchronous detection, which direct component results from the pilot carrier being synchronously detected, conditions a multiplexer to apply digitized baseband VSB signals as input signal to digital filters that provide ghost-cancellation and equalization. These filters have weighting coefficients that are adjusted by a digital signal processor responding to a portion of the data field synchronization (DFS) codes in the first lines or data segments of data fields, providing the direct component results from the pilot carrier being synchronously detected. Accordingly, the filters are operated as adaptive filters during the reception of VSB DTV signals.

When QAM signals are received by a receiver as described in patent application Ser. No. 08/614,471, no direct component accompanies baseband QAM signals recovered in complex form by synchronous detection. The lack of such direct component conditions a multiplexer to apply digitized baseband QAM signals in complex form as input signal to the digital filters that provide ghost-cancellation and equalization. The lack of such direct component conditions the weighting coefficients of the digital filters that provide ghost-cancellation and equalization to have preset values, and the filters are not operated as adaptive filters during the reception of QAM DTV signals.

While no standard is yet established for ghost-cancellation reference signals in QAM TV signals, insofar as the inventors are aware, it is here pointed out that adaptive operation of the ghost-cancellation and equalization filters is possible using data-directed methods as known per se in the prior art. U.S. Pat. No. 5,648,987 issued Jul. 15, 1997 to J. Yang, C. B. Patel, T. Liu and A. L. R. Limberg and entitled "RAPID-UPDATE ADAPTIVE CHANNEL-EQUALIZATION FILTERING FOR DIGITAL RADIO RECEIVERS, SUCH AS HDTV RECEIVERS" describes preferred data-directed methods employing the block-LMS weighting-coefficient-error minimization algorithm method, as modified to facilitate calculation in substantially real time.

The passage of the QAM DTV signals through the same ghost-cancellation and equalization filters as the VSB DTV signals is facilitated by the fact that the symbol rate in each of the in-phase and quadrature-phase components of the QAM TV signals is $5.38 \cdot 10^6$ symbols per second, resulting in a $10.76 \cdot 10^6$ symbols per second combined symbol rate for throughput through the filters. This is the same throughput rate as for the VSB DTV signals, which have a $10.76 \cdot 10^6$ symbols per second symbol rate.

The current de facto standard for ghost-cancellation reference (GCR) signal in an analog television signal transmitted in accordance with the National Television System Committee (NTSC) standard is as follows. A Bessel chirp is transmitted in the nineteenth vertical-blanking-interval (VBI) horizontal scan line of each field. This Bessel chirp is transmitted in specified polarities over a cycle of four fields facilitating its accumulation over one or more such cycles in the receiver for recovering a ghosted Bessel chirp signal on which to base calculation of the transmission channel characterization. The cost of ghost-cancellation circuitry is quite high, somewhat over $200 in the retail price of a receiver, so few analog TV receivers with ghost-cancellation circuitry have been commercially manufactured. The inventors believe that television receivers capable of receiving either DTV or NTSC signals, referred to in this document as "NTSC/DTV receivers", will be the norm during a period of transition from NTSC TV broadcasting to DTV broadcasting. Ghost-cancellation and equalization circuitry is a practical necessity in the DTV portion of the TV receiver. Accordingly, the inventors point out, it can be economical to use at least part of that same ghost-cancellation and equalization circuitry to suppress ghosts in the NTSC portion of the TV receiver.

This dual usage of the same ghost-cancellation and equalization circuitry is furthered by the nineteenth VBI scan line of each field including a GCR signal similar to that used in the DTV signal, rather than the Bessel chirp that is the current standard. The use of a similar GCR signal during DTV transmission and during NTSC transmission, rather than using different GCR signals, expedites using the same microcomputer program to calculate weighting coefficients for the ghost-cancellation and equalization filters during the reception of each type of transmission. The desirability of using a similar GCR signal during DTV transmission and during NTSC transmission, in order to reduce hardware in an NTSC/DTV receiver, has not been previously recognized, insofar as the inventors are aware.

The inventors observe that the $10.76 \cdot 10^6$ baud rate of DTV using the ATSC standard and the 3.58 MHz color subcarrier frequency of NTSC TV have harmonics that are close in frequency, facilitating the construction of a sampling clock generator for the digital filtering used in the ghost-cancellation and equalization circuitry, which sampling clock generator is susceptible of receiving automatic frequency and phase control (AFPC) signal either from the 3.58 MHz color subcarrier frequency regenerated during NTSC TV reception or from the baud rate information extracted during DTV reception.

SUMMARY OF THE INVENTION

Television signal reception apparatus for receiving a television signal selected from among transmitted television signals of different. types, which television signal reception apparatus embodies the invention, is constructed as follows. There is a receiver portion for supplying first digitized baseband signal responsive to a first type of television signal received during first times, a receiver portion for supplying second digitized baseband signal responsive to a second type of television signal received during second times, and adaptive digital filter circuitry with input and output ports and with programmable filtering weights. The adaptive digital filter circuitry is connected for adaptive operation during said first times for suppressing ghosts in said first digitized baseband signal. The same adaptive digital filter circuitry is connected for adaptive operation during said second times for suppressing ghosts in said second digitized baseband signal.

A species of such television signal reception apparatus is a DTV receiver for receiving VSB DTV transmissions and QAM DTV transmissions at different times, which DTV receiver uses the same ghost-cancellation and equalization filters during the reception of each type of transmission. Another species of such television signal reception apparatus is an NTSC/DTV receiver for receiving DTV transmissions and NTSC TV transmissions at different times, which NTSC/DTV receiver uses the same ghost-cancellation and equalization filters during the reception of each type of transmission.

DETAILED DESCRIPTION

Figure 1:
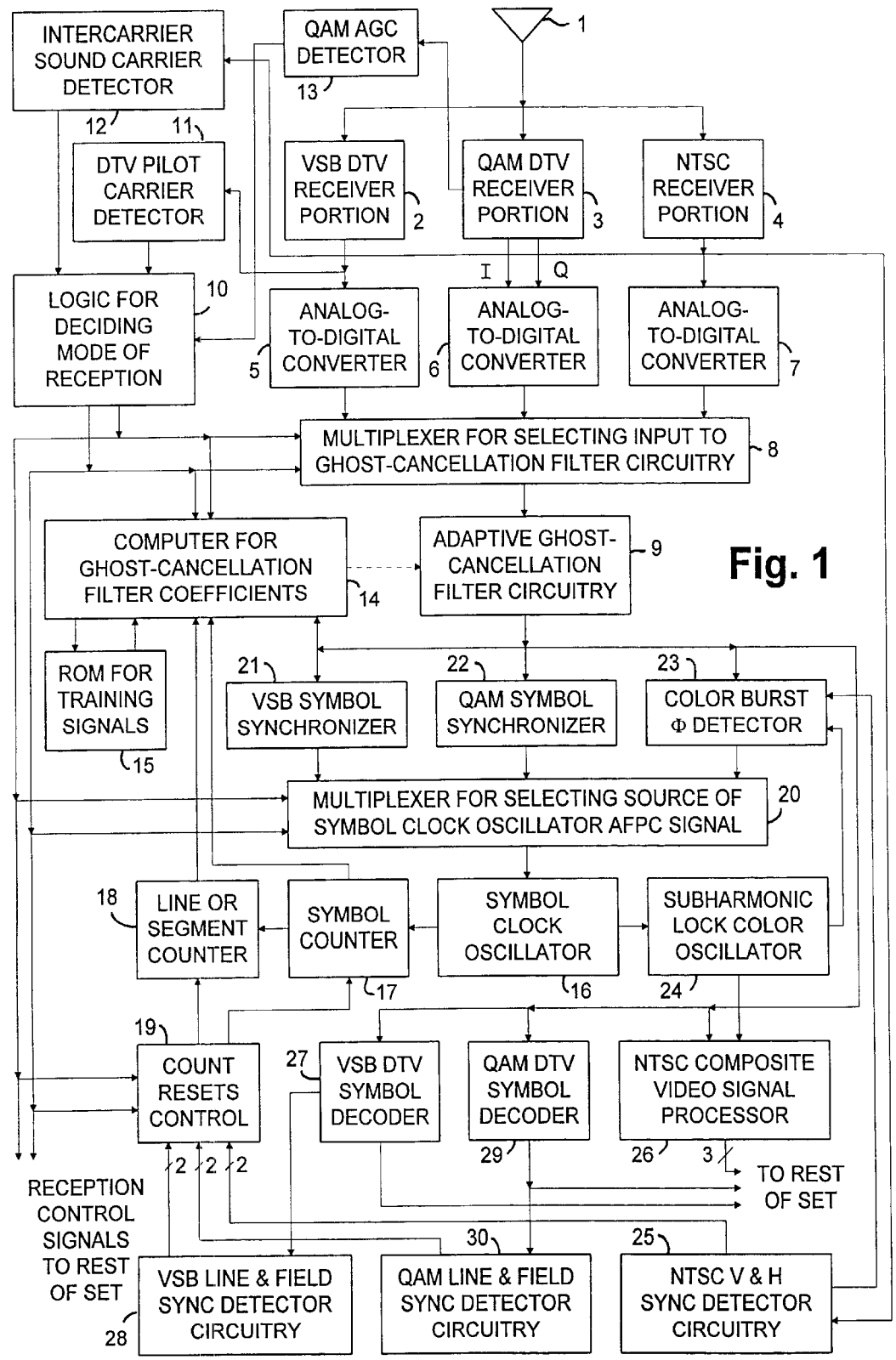
FIG. 1 is a block schematic diagram of portions of television signal reception apparatus for receiving NTSC analog television signals, VSB DTV signals as used in over-the-air terrestrial broadcasting and QAM DTV signals as used in cablecasting and direct satellite broadcasting, which portions include in accordance with the invention adaptive ghost-cancellation filter circuitry for use in the reception of any of these signals.

In FIG. 1 antenna 1 represents all sources of radio-frequency television signals to television signal reception apparatus comprising a VSB DTV receiver portion 2, a QAM DTV receiver portion 3, and an NTSC receiver portion 4. By way of examples, this TV signal reception apparatus may be included in a television set with a viewing screen and apparatus responsive to received baseband signals for creating images on the viewscreen, or this television signal reception apparatus may be included in a set-up converter, or this television signal reception apparatus may be included in a digital video recording apparatus. These receiver portions 2–4 preferably share a first mixer and may share intermediate-frequency amplifier circuitry and possibly a further mixer. Various arrangements of this type are described by A. L. R. Limberg in U.S. patent application Ser. No. 08/820,193 filed Mar. 19, 1997 and entitled "DIGITAL-AND-ANALOG-TV-SIGNAL RECEIVERS, EACH WITH SINGLE FIRST DETECTOR AND SHARED HIGH-BAND I-F AMPLIFICATION"; in U.S. patent application Ser. No. 08/825,711 filed Mar. 19, 1997 and entitled "RADIO RECEIVER DETECTING DIGITAL AND ANALOG TELEVISION RADIO-FREQUENCY SIGNALS WITH SINGLE FIRST DETECTOR"; and in a similarly titled U.S. patent application Ser. No. 09/003,513 filed Jan. 6, 1998.

In FIG. 1 the VSB DTV receiver portion 2, the QAM DTV receiver portion 3, and the NTSC receiver portion 4 supply baseband signals to analog-to-digital converters (ADCs) 5, 6 and 7, respectively, but in practice digitization may be done before baseband detection. U.S. Pat. No. 5,479,449 entitled "DIGITAL VSB DETECTOR WITH BANDPASS PHASE TRACKER, AS FOR INCLUSION IN AN HDTV RECEIVER", which issued Dec. 26, 1995 to C. B. Patel and A. L. R. Limberg, describes a triple-conversion TV receiver for VSB DTV signals in which receiver final internediate-frequency signals are digitized and the resulting digital IF signals are synchrodyned to baseband in the digital regime. Digitization of final interrnediate-frequency signals and then synchrodyning them to baseband in the digital regime is also practical for QAM DTV signals, as described in U.S. Pat. No. 5,506,636 entitled "HDTV SIGNAL RECEIVER WITH IMAGINARY-SAMPLE-PRESENCE DETECTOR FOR QAM/VSB MODE SELECTION" and issued Apr. 9, 1996 to C. B. Patel and A. L. R. Limberg. Digitization of either VSB or QAM DTV final intermediate-frequency signals and then synchrodyning them to baseband in the digital regime is further described in U.S. Pat. No. 5,715,012 issued to C. B. Patel and A. L. R. Limberg on Feb. 3, 1998 and entitled "RADIO RECEIVERS FOR RECEIVING BOTH VSB AND QAM DIGITAL HDTV SIGNALS". Digitization of either VSB or QAM DTV final intermediate-frequency signals and then synchrodyning them to baseband in the digital regime is still further described in U.S. patent application Ser. No. 08/773,949 filed by C. B. Patel and A. L. R. Limberg on Dec. 26, 1996 and entitled "RADIO RECEIVERS FOR RECEIVING BOTH VSB AND QAM DIGITAL HDTV SIGNALS" as a continuation-in-part of U.S. patent applications Nos. 08/266,753 and 08/614,471.

A concern in the design of the NTSC receiver portion 4 is the suppression of co-channel interference from VSB DTV signals. So, the NTSC receiver portion 4 preferably is of a form like that described in detail by A. L. R. Limberg in U.S. Pat. No. 5,786,870 issued Jul. 28, 1998, entitled "NTSC VIDEO SIGNAL RECEIVERS WITH REDUCED SENSITIVITY TO INTERFERENCE FROM CO-CHANNEL DIGITAL TELEVISION SIGNALS" and incorporated herein by reference.

The digital baseband response from the QAM DTV receiver portion is formatted to time-interleave in-phase and quadrature-phase samples in one of the input signals to a multiplexer 8. In the FIG. 1 DTV receiver this interleaving is done incidentally to analog-to-digital conversion of the analog response from the QAM DTV receiver portion 3. The ADC 6 is arranged to select its input samples alternately from the analog in-phase response of the QAM DTV receiver portion 3 and from the analog quadrature-phase response of the QAM DTV receiver portion 3.

The digital baseband responses from the VSB DTV receiver portion, the QAM DTV receiver portion, and the NTSC receiver portion are applied as input signals to the multiplexer 8, which selects one of these digital baseband responses as input signal for adaptive ghost-cancellation filter circuitry 9. The adaptive ghost-cancellation filter circuitry 9 is used to filter response from a selected one of the respective digitized baseband responses of the VSB DTV receiver portion 2, the QAM DTV receiver portion 3, and the NTSC receiver portion 4. The multiplexer 8 makes this selection responsive to selection signals supplied by logic circuitry 10 used for deciding the current mode of reception from the received signal. The multiplexer 8 may comprise three banks of tri-states. When the logic circuitry 10 supplies a signal indicating the reception of a VSB DTV signal, a first of these banks of tri-states supplies the bits of the digital response of ADC 5 at low source impedances to the input port of the ghost-cancellation filter circuitry 9 as applied input signal thereto. When the logic circuitry 10 supplies a signal indicating the reception of a QAM DTV signal, a second bank of these tri-states supplies the bits of the digital response of ADC 6 at low source impedances to the input port of the ghost-cancellation filter circuitry 9. When the logic circuitry 10 supplies a signal indicating the reception of an NTSC analog TV signal, a third bank of these tri-states supplies the bits of the digital response of ADC 7 at low source impedances to the input port of the ghost-cancellation filter circuitry 9 as applied input signal thereto.

If a VSB DTV pilot signal accompanies the signal received by the FIG. 1 portion of the TV set, a DTV pilot carrier detector 11 associated with the VSB DTV receiver portion 2 responds to this condition to indicate the reception of a VSB DTV signal. The DTV pilot carrier detector 11 can be one which responds to the baseband response of the VSB DTV receiver portion 2 exhibiting a direct offset owing to synchronous detection of the pilot carrier accompanying the VSB DTV signal, for example. The logic circuitry 10 responds to this indication for conditioning the first bank of tri-states in the multiplexer 8 to apply the bits of the digital response of ADC 7 at low source impedances to the input port of the ghost-cancellation filter circuitry 9.

If an NTSC signal of substantial strength is received by the FIG. 1 portion of the TV set, an intercarrier sound carrier detector 12 associated with the NTSC receiver portion 4 responds to pronounced 4.5 MHz intercarrier generated responsive to this condition for indicating the reception of a NTSC analog TV signal. The logic circuitry 10 responds to the intercarrier sound carrier detector 12 indication of pronounced 4.5 MHz intercarrier generation for conditioning the third bank of tri-states in the multiplexer 8 to apply the bits of the digital response of ADC 7 at low source impedances to the input port of the ghost-cancellation filter circuitry 9. The intercarrier sound carrier detector 12 can be of a type detecting whether the level of 4.5 MHz intercarrier sound intermediate-frequency prior to any limiter or limiter-amplifier therefor exceeds or does not exceed a prescribed threshold level. Alternatively, the intercarrier sound carrier detector 12 can be of a type detecting amplitude variations of sound I-F limiter-amplifier response caused by failure of sustained 4.5 MHz intercarrier generation. This latter alternative avoids the need for selective filtering other than that used in the sound I-F limiter-amplifier, which avoidance is desirable in designs using monolithic integrated circuitry.

The FIG. 1 portion of the TV set is constructed so that if a QAM DTV signal of sufficient strength to be useful is received, a threshold detector 13 will respond to the development of an automatic gain control (AGC) signal in the QAM DTV receiver portion 3 of the TV set shown in part in FIG. 1. If there are no indications of VSB DTV signal reception or of NTSC analog TV signal reception from the detectors 11 and 12, but the receiver exhibits automatic gain control responsive to QAM signals being received, the logic circuitry 10 presumes that QAM DTV reception takes place and conditions the second bank of tri-states in the multiplexer 8 to apply the bits of the digital response of ADC 6 at low source impedances to the input port of the ghost-cancellation filter circuitry 9.

If the receiver does not exhibit automatic gain control or AGC responsive to QAM signals being received, the logic circuitry 10 presumes that no useful signal is being received and does not condition any of the first, second and third banks of tri-states in the multiplexer 8 to apply bits from low source impedances to the input port of the ghost-cancellation filter circuitry 9. The input port of the ghost-cancellation filter circuitry 9 can be arranged to have a null input signal during such condition.

The output port of the ghost-cancellation filter circuitry 9 supplies signal to a computer 14 used for calculating weighting coefficients for the component digital filters in the circuitry 9. As will be described in greater detail further on in this specification, during the reception of VSB DTV signal and during the reception of NTSC analog TV signal, the computer 14 will select portions of the received signal containing a ghost-cancellation reference signal on which to base calculations of initial weighting coefficients for the component digital filters in the circuitry 9. A read-only memory (ROM) 15 is associated with the computer for storing a priori knowledge of the preferred form(s) for the selected portions of the received signal as they would be were they to be received without attending ghosts. At the time of filing this application the ghost-cancellation reference signals for NTSC analog TV and for ATSC DTV differ, but in accordance with an aspect of the invention it is desirable for the ghost-cancellation reference signals for NTSC analog TV and for ATSC DTV to resemble each other so that the ROM 15 can be constructed without need for as much storage capability.

A sampling clock generator 16 generates the sampling clock signals used by the ADCs 5, 6 and 7. The rate of the sampling clock signals is preferably a multiple of the symbol rate for DTV signals, with the multiple preferably being an integral power of two. This facilitates a symbol counter 17 counting the sampling clock signals to derive a count of the number of symbols per line—that is, the number of symbols per data segment in the case of DTV signals and the arbitrary number of symbols per horizontal scan line in the case of analog TV signals. The count of the number of symbols per line is reset on the next sampling clock signal after a full count of the number of symbols per horizontal scan line is reached. A scan line or data segment counter 18 responds to full count indications from the symbol counter 17 to count the number of data segments per data field in the case of DTV signals and the number of horizontal scan lines per image field in the case of analog TV signals. This count is reset after symbol counter 17 reaches a full count of the number of symbols per horizontal scan line after the counter 18 reaches a full count of the number of data segments per data field in the case of DTV signals and the number of horizontal scan lines per image field in the case of analog TV signals. The computer 14 responds to a prescribed line count from the counter 18 to read from the ROM 15 using the symbol count from the symbol counter 17 as read addressing. A count-resets controller 19 determines for the type of TV signal currently being received what the full counts shall be for the counters 17 and 18; the count-resets controller 19 also determines the correct phasings of the symbol count and line count the counters 17 and 18 respectively provide. These counts are used by the computer 14 to govern its selection of the portions of the received signal containing GCR signal on which to base calculations of weighting coefficients for the component digital filters in the circuitry 9.

The sampling clock generator 16 contains a master clock oscillator receiving frequency and phase control (AFPC) signal from the output port of a multiplexer 20 which selects that AFPC signal from an appropriate source for the type of signal currently being received. The multiplexer 20 makes this selection responsive to the selection signals supplied by logic circuitry 10. The output port of the ghost-cancellation filter circuitry 9 supplies signal to a VSB symbol synchronizer 21 supplying a first source of AFPC signal to a first input port of the multiplexer 20, to a QAM symbol synchronizer 22 supplying a second source of AFPC signal to a second input port of the multiplexer 20, and to a color burst phase detector 23 supplying a third source of AFPC signal to a first input port of the multiplexer 20.

A local color oscillator 24 supplies the color burst phase detector 23 with color subcarrier for synchronously detecting gated color burst. The local color oscillator 24 is locked to a subharmonic of the oscillations of the master clock oscillator in the sampling clock generator 16. This can be accomplished by detecting zero crossings of the oscillations of the master clock oscillator, counting the detected zero crossings in a binary counter, and using the square wave generated as the most significant bit of the count to phase-lock the color oscillator 24. Phase locking of the color oscillator 24 can be done using injection lock or quadricorrelation procedures. NTSC vertical and horizontal sync detection circuitry 25 responds to baseband composite video signal from the NTSC receiver portion 4 of the television receiver apparatus for detecting the occurrences of horizontal sync pulses and field retrace times. These detection results are supplied to the count resets controller 19 and, when the logic circuitry 10 supplies the count resets controller 19 a signal indicating the reception of an analog TV signal, the controller 19 is conditioned to use these detection results for determining when the counters 17 and 18 are to be reset to initial count conditions. This phases the symbol and sync counts so the computer 14 can at appropriate times read from the ROM 15 a ghost-free ghost-cancellation reference signal for analog TV. The output port of the ghost-cancellation filter circuitry 9 supplies input signal to an NTSC composite video signal processor 26, which generates color signals for application to the remainder of the television receiver apparatus.

When the logic circuitry 10 supplies a signal indicating the reception of a VSB DTV signal, the multiplexer 20 is conditioned to supply the master oscillator in the sampling clock generator 5.38 MHz half-symbol-rate components from the ghost-cancellation filter circuitry 9 response and circuitry for doubling or quadrupling the selected half-symbol-rate component for comparison with frequency-divided oscillations from the master clock oscillator to generate AFPC signal for the master clock oscillator. When the logic circuitry 10 supplies a signal indicating the reception of a QAM DTV signal, the multiplexer 20 is conditioned to supply the master oscillator in the sampling clock generator with AFPC signal from the QAM symbol synchronizer 22. The QAM symbol synchronizer 22 preferably includes a filter for selecting 2.39 MHz half-symbol-rate components from the ghost-cancellation filter circuitry 9 response and circuitry for doubling or quadrupling the selected half-symbol-rate component for comparison with frequency-divided oscillations from the master clock oscillator to generate AFPC signal for the master clock oscillator. When the logic circuitry 10 supplies a signal indicating the reception of an NTSC analog TV signal, the multiplexer 20 is conditioned to supply the master oscillator in the sampling clock generator with AFPC signal from the color burst phase detector 21.

The output port of the ghost-cancellation filter circuitry 9 supplies input signal to a VSB DTV symbol decoder 27, which generates a binary code stream for application to the remainder of the television receiver apparatus. The output port of the ghost-cancellation filter circuitry 9 also supplies input signal to circuitry 28 for detecting the occurrences of line sync codes and field sync codes. These detection results are supplied to the count resets controller 19 and, when the logic circuitry 10 supplies the count resets controller 19 a signal indicating the reception of a VSB DTV signal, the controller 19 is conditioned to use these detection results for determining when the counters 17 and 18 are to be reset to initial count conditions. This phases the symbol and sync counts so the computer 14 can at appropriate times read from the ROM 15 ghost-free ghost-cancellation reference signal for VSB DTV stored in ROM 15.

The output port of the ghost-cancellation filter circuitry 9 supplies input signal to a QAM DTV symbol decoder 29, which generates a binary code stream for application to the remainder of the television receiver apparatus. The output port of the ghost-cancellation filter circuitry 9 supplies input signal to circuitry 30 for detecting the occurrences of line sync codes and field sync codes. These detection results are supplied to the count resets controller 19 and, when the logic circuitry 10 supplies the count resets controller 19 a signal indicating the reception of a QAM DTV signal, the controller 19 is conditioned to use these detection results for determining when the counters 17 and 18 are to be reset to initial count conditions. In case that cablecast standards are developed in which the QAM includes ghost-cancellation reference signal, this will phase the symbol and sync counts so the computer 14 can read from the ROM 15 at appropriate times ghost-free ghost-cancellation reference signal for QAM DTV.

During analog TV reception AGC signal for the NTSC receiver portion 2 can be developed conventionally, in response to peak detection of horizontal sync tips. To forestall AGC lock-out, the NTSC vertical and horizontal synchronization circuitry 25 draws its input signal from the baseband response of the NTSC receiver portion 4 directly as shown in FIG. 1 or, alternatively, from that response as digitized by the ADC 7. During VSB DTV reception AGC signal for the VSB receiver portion 2 is preferably developed from the direct component of the baseband response of the VSB DTV receiver portion 2 arising from the synchronous detection of the pilot carrier, as described by C. B. Patel and A. L. R. Limberg in U.S. Pat. No. 5,636,252 entitled "AUTOMATIC GAIN CONTROL OF RADIO RECEIVER FOR RECEIVING DIGITAL HIGH-DEFINITION TELEVISION SIGNALS" issued Jun. 3, 1997. During QAM DTV reception, AGC signal is preferably developed as described by A. L. R. Limberg in U.S. Pat. No. 5,805,241 issued Sep. 8, 1998, entitled "NOISE-IMMUNE AUTOMATIC GAIN CONTROL FOR QAM RADIO RECEIVERS" and incorporated herein by reference. Alternatively, AGC signal is developed during VSB and/or QAM DTV reception by amplitude detection of modulation peaks.

A number of different arrangements of computer 14 and adaptive ghost-cancellation filter circuitry 9 elements are known to be possible; and the selection of which of these arrangements depends in certain degree upon the ghost-cancellation reference signals that are finally accepted as standard. The ghost-cancellation filter circuitry 9 that is usually preferred cascades an infinite-impulse-response (IIR) digital filter for canceling post-ghosts with substantial delay after a finite-impulse-response (FIR) digital filter for canceling post-ghosts with little delay, canceling pre-ghosts and implementing channel equalization after separately defined ghosts are substantially canceled. The IIR filter typically includes a digital subtractor supplying its difference output signal as a response of the IIR filter, receiving the response of the previous FIR filter as minuend input signal, and receiving as subtrahend input signal the IIR filter response via a recursive feedback path that includes a component FIR filter. This component FIR filter has many zero weighting coefficients in its kernel, which lends it to being designed to have a specialized construction using programmable bulk delay.

Ideally, when DTV signals are being received, the IIR filter response will switch between certain well-defined signal levels associated with respective symbol codes. The IIR filter response can be compared with that response as quantized to ones of these well-defined signal levels, for generating error signals to support decision-feedback equalization (DFE) methods of adjusting the coefficients in the kernels of the adaptive ghost-cancellation filter circuitry 9. As long as QAM DTV signals are transmitted without GCR signals, DFE methods have to be used' when receiving QAM DTV signals. So-called "blind" equalization, which does not rely on a priori knowledge of the transmission channel has to be used for initial adjustment of the weighting coefficients of the ghost-cancellation filter circuitry 9 when a QAM DTV channel is first tuned to. Blind equalization is subject to stalling when the gradient-following procedure used for converging the ghost-cancellation filter circuitry 9 reach localized false minima called "saddlepoints" rather than the ultimate minimum the procedure is supposed to reach. Blind equalization is often a slow procedure when the transmission channel is badly ghosted as it is apt to be when receiving terrestrial over-the-air broadcasts. When VSB DTV signals are received, blind equalization is therefore eschewed in favor of initializing the filter coefficients of the ghost-cancellation filter circuitry 9 based on a training signal or ghost-cancellation (GCR) signal. After such initialization, DFE methods are advantageously used for adjusting the filter coefficients of the ghost-cancellation filter circuitry 9 so as to track changes in multipath reception conditions.

Decision-feedback equalization methods using a continuous least-mean-squares (LMS) weighting-coefficient-error minimization algorithm, as modified to facilitate calculation in substantially real time, are described by A. L. R. Limberg in U.S. patent application Ser. No. 08/832,674 filed Apr. 8, 1997 and entitled "DYNAMICALLY ADAPTIVE EQUALIZER SYSTEM AND METHOD". U.S. pat. No. 5,648,987 issued Jul. 15, 1997 to J. Yang, C. B. Patel, T. Liu and A. L. R. Limberg and entitled "RAPID-UPDATE ADAPTIVE CHANNEL-EQUALIZATION FILTERING FOR DIGITAL RADIO RECEIVERS, SUCH AS HDTV RECEIVERS" describes preferred DFE methods employing the block-LMS weighting-coefficient-error minimization algorithm method, as modified to facilitate calculation in substantially real time. C. M. Zhao, X. Y. Hu and X. H. Yu indicate in their September 1998 paper "Block Sequential Least Squares Decision Feedback Equalization Algorithm with Application to Terrestrial HDTV Transmission" appearing in IEEE Transactions on Broadcasting, Vol. 44, No. 3, that using block-sequential LMS optimization procedures rather than continuous LMS optimization procedures permits a bit error rate of $3 \times 10^{-9}$ to be achieved with signals having 3.5 dB poorer signal-to-noise ratio.

It is customary to include the quantizer in the recursive feedback path of the IIR filter when DTV signals are being received and decision-feedback methods are used for adjusting the coefficients of the adaptive ghost-cancellation filter circuitry 9. NTSC analog television signals do not switch between certain well-defined signal levels and so do not lend themselves to decision-feedback methods in which the IIR filter response is compared with that response as quantized to ones of these well-defined signal levels. Any quantizer included in the recursive feedback path of the IIR filter during DTV reception is excluded from that path when NTSC analog television signals are being received.

The Bessel chirp that is the current defacto standard GCR signal in NTSC analog TV can be used for adjusting the filter coefficients of the ghost-cancellation filter circuitry 9. This requires the computer 14 to be capable of calculating weighting coefficients for the adaptive ghost-cancellation filter circuitry 9 by steps of performing discrete Fourier transform (DFT) analysis of the filter circuitry 9 response to the Bessel function, characterizing the channel by dividing the elements of the DFT response by corresponding elements of the DFT of the ghost-free Bessel chirp as subjected to lowpass filtering descriptive of ideal channel characteristics, and complementing the DFT characterizing the channel to make a current determination of the weighting coefficients of the filter circuitry 9. After initially determining the weighting coefficients of the filter circuitry 9 when a transmission channel is first received, these coefficients can be updated by comparing the current determinations of these coefficients with previous determinations to generate error signals and then accumulating fractions of these error signals into the previous determinations of these coefficients to accomplish the updating. The reader is referred to U.S. Pat. No. 5,331,416 entitled "METHODS FOR OPERATING GHOST-CANCELATION CIRCUITRY FOR TV RECEIVER OR VIDEO RECORDER", which issued Jul. 19, 1994 to C. B. Patel and J. Yang, for details concerning calculation of the weighting coefficients for the adaptive ghost-cancellation filter circuitry 9 using DFT methods.

The middle PN63 sequence included in DFS signal of the 1995 ATSC DTV standard, as separated by differentially combining corresponding samples of successive field synchronization code sequences, can be the basis for initializing the weighting coefficients of the filter circuitry 9 using DFT methods. Initializing the weighting coefficients this way avoids the problem encountered with DFE methods that the gradient-following procedure used for converging filter coefficients stalls in localized false minima called "saddle-points" rather than reaching the desired real minimum. After initializing the weighting coefficients of the filter circuitry 9 using DFT methods it can be advantageous to switch over to using DFE methods to reduce any errors that thereafter occur in weighting coefficients, since DFE methods tend better to follow rapidly varying ghosting conditions (e. g., aircraft flutter).

U.S. Pat. No. 5,600,380 entitled "GHOST-CANCELATION REFERENCE SIGNAL ACQUISITION CIRCUITRY, AS FOR TV RECEIVER OR VIDEO RECORDER", which issued Feb. 4, 1997 to C. B. Patel and J. Yang, is incorporated herein by reference for its detailed description of circuitry for separating first and second component GCR signals from NTSC signals. This circuitry is readily adapted for separating first and second component GCR signals from ATSC signals.

Figure 2:
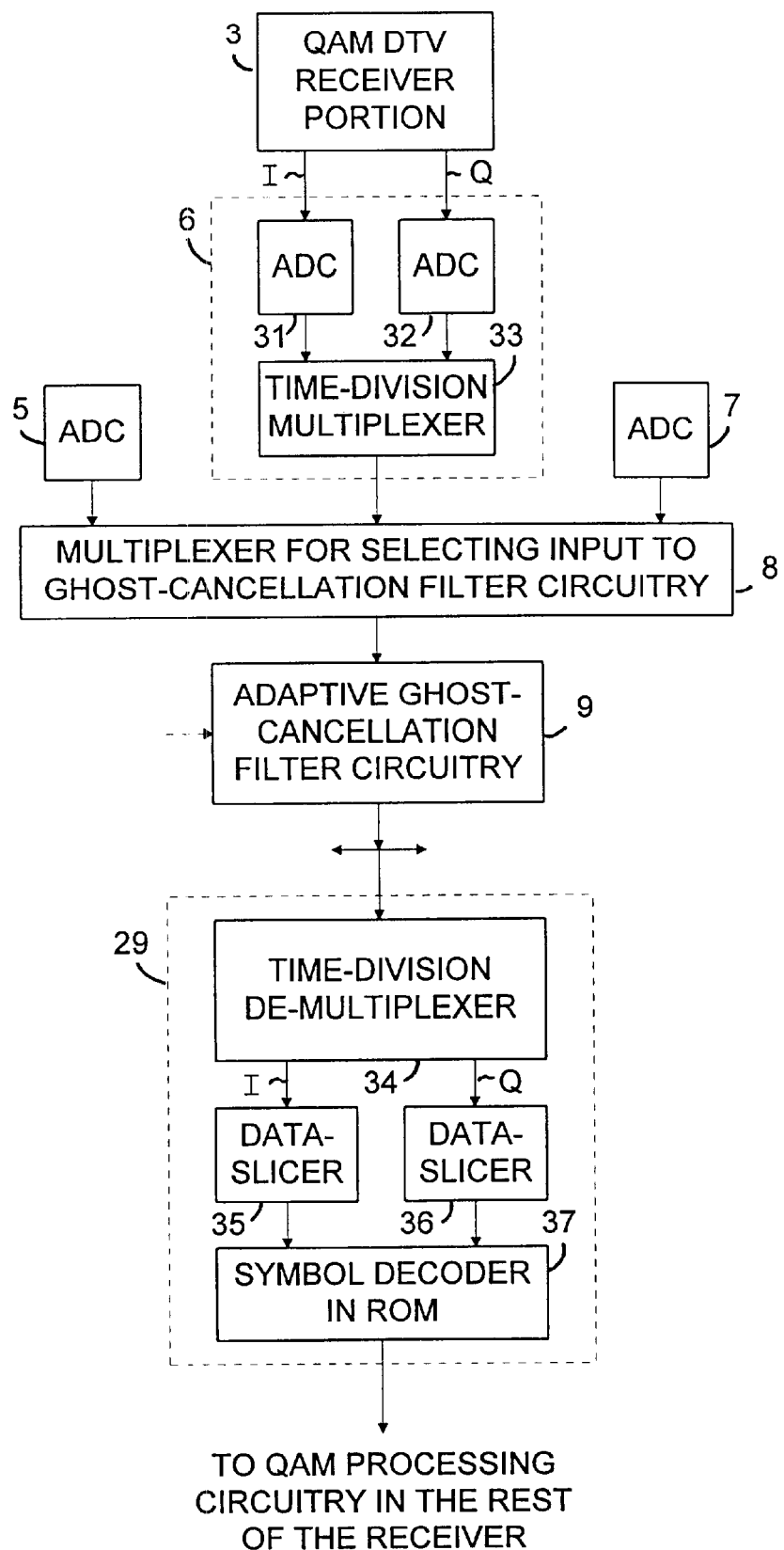
FIG. 2 is a block schematic diagram showing in detail how QAM DTV demodulation results can be processed for having baseband equalization-applied thereto by the adaptive ghost-cancellation filter circuitry used in the FIG. 1 portions of television signal reception apparatus.

FIG. 2 shows in more detail how QAM DTV demodulation results can be processed for having baseband equalization applied thereto by the adaptive ghost-cancellation filter circuitry 9. FIG. 2 shows the analog-to-digital converter 6 comprising two component analog-to-digital converters 31, 32 and a time-division multiplexer 33. The component ADCs 31 and 32 respectively digitize the in-phase component and the quadrature-phase component of the baseband QAM DTV demodulation results supplied from the QAM DTV receiver portion 3. The time-division multiplexer 33 interleaves the digitized in-phase component and the digitized quadrature-phase component of the baseband QAM DTV demodulation results on an alternate sample basis for selective application by the multiplexer 9 to the ghost-cancellation filter circuitry 9. Time-division multiplexing the digitized in-phase component and the digitized quadrature-phase component of the baseband QAM DTV avoids cross-talk between the two components which can occur if time-division multiplexing of the analog components to a single analog-to-digital converter is done instead.

FIG. 2 shows in more detail the construction of the QAM DTV symbol decoder 29 as a hard-decision type comprising a time-division de-multiplexer 34, data slicers 35 and 36, and read-only memory 37. A time-division de-multiplexer 34 demultiplexes the response of the ghost-cancellation filter circuitry 9 to recover in-phase and quadrature-phase components of the equalized baseband QAM DTV demodulation results for application to respective data slicers 35 and 36. The data slicers are bin comparators that generate input addresses for the ROM 37 which stores a symbol decoding look-up table and generates symbol decoding results in response to its input addresses. These symbol decoding results are supplied to QAM processing circuitry in the remaining portion of the television receiver, which usually includes a convolutional byte de-interleaver and Reed-Solomon decoding.

The inventors observe that the programming of the computer 14 for calculating the weighting coefficients of the filter circuitry 9 could be simplified if the GCR signals used in NTSC analog television were more similar to the data field synchronizing (DFS) signal of ATSC digital television. There would then be no need for storing a Bessel function in the ROM 15 associated with the computer 14. Since the DFS signal is longer than an NTSC scan line, the inventors propose GCR signals for NTSC analog television that are based on the triple PN63 component of the DFS signal.

Figure 3:
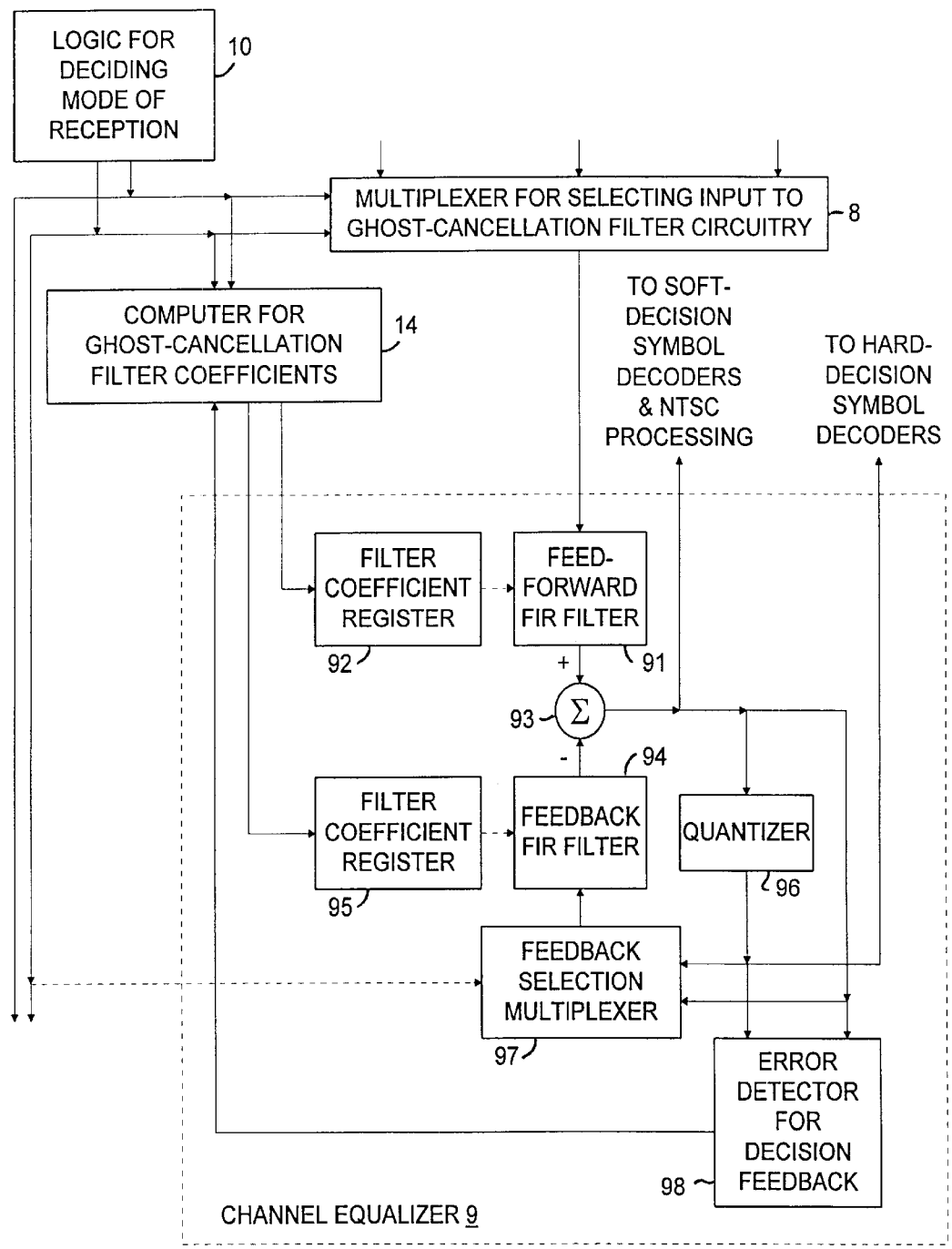
FIG. 3 is a block schematic diagram showing in detail how adaptive ghost-cancellation filter circuitry used in the FIG. 1 portions of television signal reception apparatus is modified so NTSC composite video signals can have baseband equalization applied thereto by that filter circuitry.

FIG. 3 shows details of a construction of the channel equalizer 9 which comprises a finite-impulse-response (FIR) digital filter 91 having filtering coefficients stored in a temporary storage register 92, a digital subtractor 93, an FIR digital filter 94 having filtering coefficients stored in a temporary storage register 95, a quantizer 96, a feedback selection multiplexer 97 and an error detector 98 for implementing decision feedback procedures when DTV signals are received. The FIR filter 91 is operated in the channel equalizer 9 as a feedforward FIR filter for suppressing near ghosts. The feedforward FIR filter 91 helps suppress pre-ghosts, multipath responses that are received earlier than the principal DTV signal is received. The subtractor 93, the FIR filter 94, the quantizer 96 and the feedback selection multiplexer 97 combine to provide an infinite-impulse-response (IIR) filter. The FIR filter 94, which has filtering coefficients stored in a temporary storage register 95, is operated as a feedback FIR filter in this IIR filter. This IIR filter helps suppress post-ghosts, multipath responses that are received later than the principal DTV signal is received.

When the logic circuitry 10 supplies a bit indication that the television signal currently being received is an NTSC analog television signal, the feedback selection multiplexer 97 is conditioned by this bit indication for applying the difference output signal from the subtractor 93 directly to the feedback FIR filter 94. Bit indications supplied by the logic circuitry 10 when an NTSC analog television signal is currently being received condition the computer 14 to adjust the channel equalization filtering coefficients stored in the temporary storage registers 92 and 95 in reliance upon training signals extracted from the $19^{th}$ scan lines of NTSC fields. Decision feedback methods are not used during NTSC reception.

When the logic circuitry 10 supplies a bit indication that the television signal currently being received is a DTV signal, the feedback selection multiplexer 97 is conditioned by this bit indication for applying the quantizer 96 response as input signal to the feedback FIR filter 94. The quantizer 96 quantizes the difference output signal from the subtractor 93. The error detector 98, used for implementing decision feedback procedures when DTV signals are received, generates error signal based on the difference between the difference output signal from the subtractor 93 and the quantizer 96 response. Bit indications supplied by the logic circuitry 10 when a VSB signal is currently being received condition the computer 14 to initially adjust the channel equalization filtering coefficients stored in the temporary storage registers 92 and 95 in reliance upon training signals extracted from the initial data segments of data fields. Thereafter, the computer 14 adjusts the coefficients stored in the temporary storage registers 92 and 95 using decision feedback based on the error signal generated by the error detector 98. Bit indications supplied by the logic circuitry 10 when a QAM signal is currently being received condition the computer 14 to initialize and thereafter adjust the coefficients stored in the temporary storage registers 92 and 95 using decision feedback based on the error signal generated by the error detector 98.

The ghost-cancellation filter circuitry 9 specifically described above does not provide for complex channel-equalization, but equalizes only on a real signal basis in order to economize on multiplier costs. Adaptive ghost-cancellation filter circuitry that provides for complex channel-equalization can be used in other embodiments of the invention.

FIGS. 4A, 4B, 4C and 4D are timing diagrams of proposed vertical-blanking-interval (VBI) signals for NTSC analog TV transmissions, the fields of which NTSC analog TV transmissions are consecutively numbered modulo-4.

Figure 4A:
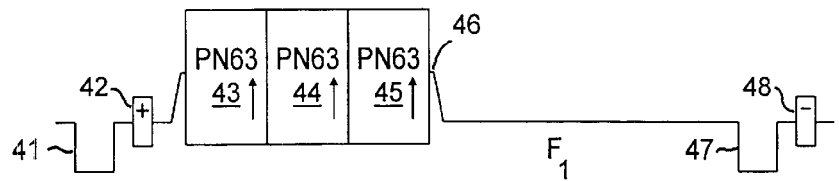
FIGS. 4A, 4B, 4C and 4D are timing diagrams of signals proposed in accordance with an aspect of the invention for accompanying NTSC analog TV transmissions, the fields of which NTSC analog TV transmissions are consecutively numbered modulo-4.
Figure 4B:
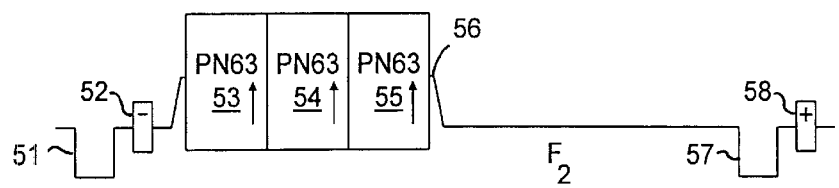
Figure 4C:
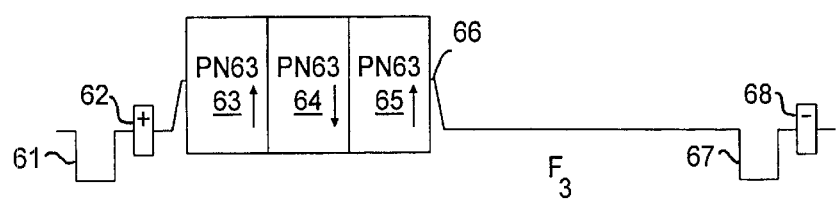
Figure 4D:
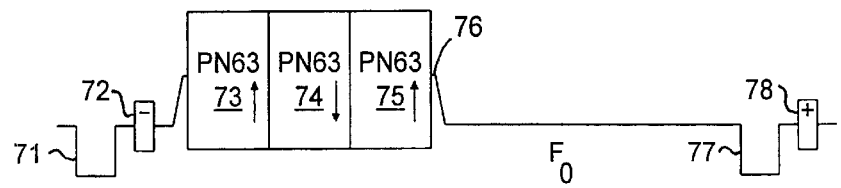
Figure 4E:
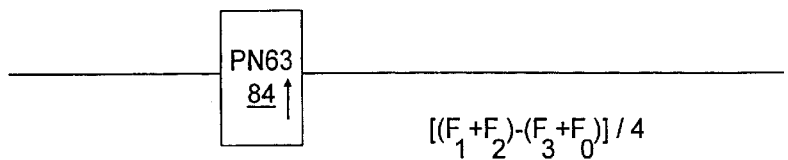
FIG. 4E is a timing diagram of a GCR signal as separated from the signals of FIGS. 4A, 4B, 4C and 4D by linearly combining corresponding samples from them in a prescribed manner, which GCR signal essentially consists of a PN63 sequence.

These timing diagrams and that of FIGS. 4E share a common modular time. The VBI signals of FIGS. 4A, 4B, 4C and 4D are inserted into successive fields $F_1$, $F_2$, $F_3$ and $F_0$, respectively. These VBI signals may comprise any one of the $11^{th}$ through $20^{th}$ scan lines of each field, the present preference being to insert them into the $19^{th}$ scan line of each field, numbering the scan lines consecutively with the first line occurring after the close of active scan in the preceding field. The insertion of the VBI signals into the $19^{th}$ scan line of each field is presumed in the description which follows.

The $19^{th}$ scan lines of FIGS. 4A, 4B, 4C and 4D begin with horizontal synchronization pulses 41, 51, 61 and 71, respectively, which pulses are depicted as being negative-going. The horizontal synchronization pulses 41, 51, 61 and 71 are respectively followed during ensuing back-porch intervals by chroma bursts 42, 52, 62 and 72. The plus and minus signs near the chroma bursts 42, 52, 62 and 72 indicate their relative polarities respective to each other, per the NTSC standard. The leading edges of the horizontal synchronization pulses 41, 51, 61 and 71 are considered to be the beginning of the vertical-blanking-interval horizontal scan lines, which lines are each of 63.55 microsecond duration in NTSC standard signals. This 63.55 microsecond duration corresponds to substantially 684 symbol periods of ATSC DTV signal and approximately 113 of these symbol periods are taken up by the horizontal synchronization pulse and its flanking porches.

The 551 symbol period between each back porch and the ensuing front porch is of sufficient duration to accommodate a pedestal extending for the 189 symbol periods taken up by three PN63 sequences and having 6-symbol-epoch rise and fall times. The current preference is for the PN sequences accompanying NTSC analog TV signals to have −1 and +1 values at −15 IRE and +95 IRE levels, respectively. This provides these sequences with substantial energy. to improve the identification of weaker ghosts, while avoiding some of the non-linearities that may be associated with very high or very low levels of modulation. The FIG. 4A VBI scan line has three consecutive PN63 sequences 43, 44 and 45 on a pedestal 46, the PN63 sequences 44 and 45 replicating the PN63 sequence 44. The FIG. 4B VBI scan line has three consecutive PN63 sequences 53, 54 and 55 on a pedestal 56, the PN63 sequences 53 and 54 and 55 replicating the PN63 sequences 43 and 44 and 45 of FIG. 4A. The FIG. 4C VBI scan line has three consecutive PN63 sequences 63, 64 and 65 on a pedestal 66, the PN63 sequences 63 and 65 replicating the PN63 sequences 53 and 55 of FIG. 4B. The PN sequence 64 of FIG. 4C has the same amplitude as the PN sequence 54 of FIG. 4B but has the opposite sense of polarity. The FIG. 4D VBI scan line has three consecutive PN63 sequences 73, 74 and 75 on a pedestal 76, the PN63 sequences 73 and 74 and 75 replicating the PN63 sequences 63 and 64 and 65 of FIG. 4C. The pedestals 46, 56, 66 and 76 in fields $F_1$, $F_2$, $F_3$ and $F_0$ each have a value of +40 IRE levels and transitions to this level from the porches at 0 IRE levels can be made as rapidly as the 40-IRE-level transitions of horizontal sync pulse edges, which take less than 0.254 microsecond. There are no bandwidth constraints, then, to prevent the pedestal transitions each to be made within six ATSC symbol epochs, or 0.557 microsecond.

The $19^{th}$ scan lines of FIGS. 4A, 4B, 4C and 4D end when the front porches for the horizontal synchronization pulses 47, 57, 67 and 77, respectively, of the ensuing $20^{th}$ scan lines begin. The horizontal synchronization pulses 47, 57, 67 and 77 are respectively followed during ensuing back-porch intervals by chroma bursts 48, 58, 68 and 78 of those $20^{th}$ scan lines.

FIG. 4E shows the separated GCR signal 84 that results when the GCR signals from two successive fields that are in two successive frames of NTSC analog TV signal are differentially combined, assuming that the GCR signals are of the sort shown in FIGS. 4A, 4B, 4C and 4D. A separated GCR signal per FIG. 4E results when the sum of the GCR signals of fields $F_1$, and $F_2$ of FIGS. 4A and 4B is differentially combined with the sum of fields $F_3$ and $F_0$ of FIGS. 4C and 4D, the combinings being done on a corresponding samples basis. The horizontal synchronizing pulses, their porches and the chroma bursts, as well as the second component GCR signal, are suppressed in the separated GCR signal of FIG. 4E.

Supposing the initial PN63 sequences 43, 53, 63 and 73 to begin 125 symbol epochs after the beginning of the VBI scan line, the separated GCR signal 84 will begin 188 symbol epochs after the start of the horizontal scan line and will end 251 symbol epochs after the start of the horizontal scan line. Pre-ghosts up to 17.467 microseconds (188 symbol epochs) before the principal received signal can be detected from the FIG. 4E signal without being overlapped by signal from the preceding VBI scan line. Post-ghosts delayed up to 50.528 microseconds (546 symbol epochs) after the principal received signal can be detected from the FIG. 4E signal without being overlapped by signal following the back porch in the succeeding VBI scan line.

In variants of the set of signals shown in FIGS. 4A, 4B, 4C and 4D, the PN63 sequences 43, 53, 63 and 73 are dispensed with wholly or in part and the PN63 sequences 44, 54, 64 and 74 and the ensuing PN63 sequences 45, 55, 65 and 75 are moved ahead in time. This advances the separated GCR signal 84 in time, decreasing pre-ghost detection capability in favor of increasing post-ghost detection capability.

Figure 5:
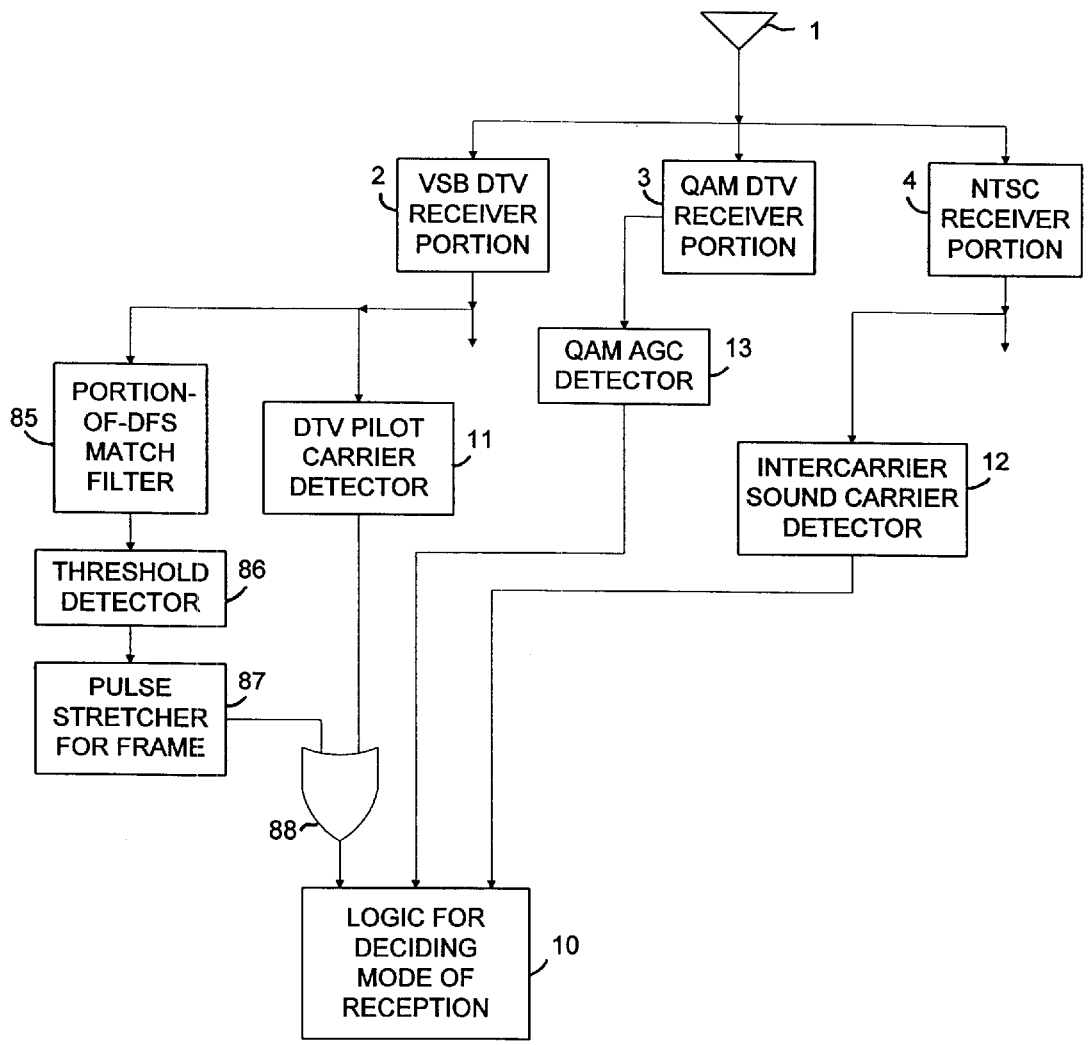
FIG. 5 is a block schematic diagram of a modification made to the FIG. 1 portions of television signal reception apparatus in an alternative embodiment of the invention.

FIG. 5 shows a modification of the FIG. 1 portions of television signal reception apparatus, which modification is made in an alternative embodiment of the invention. The modification determines the times when VSB DTV signal is being received by detecting the presence of a prescribed portion of the data field synchronizing signal consisting of a large number of samples of known value. This prescribed portion of the DFS signal can be the PN511 sequence, for example. Or this prescribed portion of the DFS signal can be the PN511 sequence followed by the earliest PN63 sequence, by way of a counterexample. A match filter 85 for the prescribed portion of the DFS signal supplies a response to baseband signal from the VSB DTV receiver portion 2 of the television receiver. This response peaks whenever the prescribed portion of the DFS signal occurs, but is of substantially lower value for other portions of the baseband signal. A threshold detector 86 responds to the match filter 85 response for supplying a ONE when the match filter 85 response exceeds a prescribed threshold value and for supplying a ZERO when the match filter 85 response does not exceed the prescribed threshold value. The threshold detector 86 output signal is supplied as input signal to a pulse stretcher 87, which stretches any ONE pulse in the threshold detector 86 output signal to a continuous ONE extending over an interval somewhat longer than a data field interval.

FIG. 5 shows the pulse stretcher 87 as stretching pulses for a data frame interval, so indication of the reception of a VSB DTV signal will be maintained even if impulse noise during one DFS interval interferes with match filter 85 response peaking above prescribed threshold value. The stretching period can be extended to a few frames if further impulse noise immunity is found to be desirable. The pulse stretcher 87 can be a monostable multivibrator or "oneshot", but in integrated-circuit construction it is preferable to use a bistable multivibrator or set-reset flip-flop which is set by ONEs from the threshold detector 86 and is rest periodically by pulses generated at data frame intervals or at longer intervals.

The logic circuitry 10 could be reconnected to use the pulse stretcher 87 output signal as the sole basis for deciding whether or not the currently received television signal is a VSB DTV signal. However, FIG. 5 shows logic circuitry 10 reconnected for receiving the response of an OR gate 88. The OR gate 88 logically combines the pulse stretcher 87 indication of a VSB DTV signal being currently received with the DTV pilot carrier detector 11 indication of a VSB DTV signal being currently received. If multipath distortion reduces pilot carrier level sufficiently that the DTV pilot carrier detector 11 fails to indicate the current reception of a VSB DTV signal, the pulse stretcher 87 indication of a VSB DTV signal being currently received is likely to remain, keeping the television receiver in its VSB reception mode. If impulse noise interferes with match filter 85 response peaking above prescribed threshold value during the current reception of a VSB DTV signal, so the pulse stretcher 87 fails to indicate the current reception of a VSB DTV signal, the DTV pilot carrier detector 11 is likely to indicate the presence of pilot carrier, keeping the television receiver in its VSB reception mode.

There are reasons for one to use passband ghost-cancellation filter circuitry with the QAM DTV receiver portion 3, rather than baseband ghost-cancellation filter circuitry. So, embodiments of the invention in which the baseband adaptive ghostcancellation filter circuitry 9 is used only for digitized baseband signals from the VSB DTV receiver portion 2 and the NTSC receiver portion 4 are contemplated by the inventors. Embodiments of the invention in which the baseband adaptive ghostcancellation filter circuitry 9 employs fractional-baud-rate equalization rather than baud-rate equalization are also contemplated by the inventors. The FIG. 3 circuitry is modified to insert a rate-reduction filter before the quantizer 96 and to insert a re-sampling filter after the quantizer 96, so the error detector 98 receives signals with full digital bandwidth to be compared for generating decision feedback information.

In the claims which follow, the various receiver portions included in each television signal reception apparatus may include shared elements used in common by at least two of those receiver portions. In the claims which follow, the word "said" is used to indicate antecedence rather than the word "the", which is used for other grammatical purposes.

What is claimed is:

1. A television signal reception apparatus for receiving a television signal selected from among transmitted television signals of different types, said television signal reception apparatus comprising:
    a receiver portion for supplying first digitized baseband signal responsive to a first type of television signal received during first times;
    a receiver portion for supplying second digitized baseband signal responsive to a second type of television signal received during second times; and
    adaptive digital filter circuitry with input and output ports and with programmable filtering weights, connected for adaptive operation during said first times for suppressing ghosts in said first digitized baseband signal based upon a first ghost cancellation reference signal extracted from said first digitized baseband signal, and connected for adaptive operation during second times for suppressing ghosts in said second digitized baseband signal based upon a second ghost cancellation reference signal extracted from said second digitized baseband signal.

2. A television signal reception apparatus for receiving a television signal selected from among transmitted television signals of different types, said television signal reception apparatus comprising:
    a receiver portion for supplying first digitized baseband signal responsive to a first type of television signal received during first times;
    a receiver portion for supplying second digitized baseband signal responsive to a second type of television signal received during second times; and
    adaptive digital filter circuitry with input and output ports and with programmable filtering weights, connected for adaptive operation during said first times for suppressing ghosts in said first digitized baseband signal, and connected for adaptive operation during said second times for suppressing ghosts in said second digitized baseband signal,
    wherein said adaptive digital filter circuitry comprises:
        a feedback selection multiplexer having first and second input ports and having an output port for supplying a feedback selection multiplexer output signal selectively responsive during said first times to signal supplied to said first input port of said feedback selection multiplexer and selectively responsive during said second times to signal supplied to said second input port of said feedback selection multiplexer;
        a first finite-impulse-response adaptive digital filter connected for supplying a feedforward response to said first digitized baseband signal during said first times and to said second digitized baseband signal during said second times;
        a second finite-impulse-response adaptive digital filter connected for supplying a feedback response to said feedback selection multiplexer output signal;
        a digital subtractor connected for receiving said feedforward response as a minuend input signal, for receiving said feedback response as a subtrahend input signal, and for supplying a difference output signal as a equalized response of said adaptive digital filter circuitry that is applied to said first input port of said feedback selection multiplexer;
        a quantizer responsive to said equalized response of said adaptive digital filter circuitry for supplying a quantizer response that is applied to said second input port of said feedback selection multiplexer;
        an error detector for generating decision feedback information by comparing said difference output signal to said quantizer response; and
        a computer for computing adjustments of said programmable filtering weights, said adjustments being computed during said second times depending on said decision feedback information generated during said second times.

3. The television signal reception apparatus of claim 2, wherein said computer during said first times computes adjustments of said programmable filtering weights depending on a training signal extracted from said first digitized baseband signal.

4. The television signal reception apparatus of claim 3, wherein said first type of television signal is an analog television signal.

5. The television signal reception apparatus of claim 4, wherein said second type of television signal is a vestigial-sideband amplitude-modulation digital television signal.

6. The television signal reception apparatus of claim 5, wherein said computer during said second times computes initial adjustments of said programmable filtering weights depending on training signal extracted from said second digitized baseband signal.

7. The television signal reception apparatus of claim 4, wherein said second type of television signal is a quadrature-amplitude-modulation digital television signal.

8. The television signal reception apparatus of claim 2, wherein said computer during said second times computes initial adjustments of said programmable filtering weights depending on training signal extracted from said second digitized baseband signal.

9. A television signal reception apparatus for receiving a television signal selected from among digital television and analog television signals, said television signal reception apparatus comprising:

a receiver portion for supplying first digitized baseband signal responsive to a vestigial sideband amplitude-modulation analog television signal received during first times;

a receiver portion for supplying second digitized baseband signal responsive to a digital television signal received during second times; and adaptive digital filter circuitry with input and output ports and with programmable filtering weights, connected for adaptive operation during said first times for suppressing ghosts in said first digitized baseband signal based upon a first ghost cancellation reference signal extracted from said first digitized baseband signal, and connected for adaptive operation during said second times for suppressing ghosts in said second digitized baseband signal based upon a second ghost cancellation reference signal extracted from said second digitized baseband signal.

10. A television signal reception apparatus for receiving a television signal selected from among digital television and analog television signals, said television signal reception apparatus, comprising:

a receiver portion for supplying first digitized baseband signal responsive to a vestigial sideband amplitude-modulation analog television signal received during first times;

a receiver portion for supplying second digitized baseband signal responsive to a digital television signal received during second times;

adaptive digital filter circuitry with input and output ports and with programmable filtering weights, connected for adaptive operation during said first times for suppressing ghosts in said first digitized baseband signal, and connected for adaptive operation during said second times for suppressing ghosts in said second digitized baseband signal;

a multiplexer for selectively applying said first digitized baseband signal to the input port of said adaptive digital filter circuitry during said first times and for selectively applying said second digitized baseband signal to the input port of said adaptive digital filter circuitry during said second times; and an intercarrier sound carrier detector connected to said analog television signal receiver portion for sensing the generation of intercarrier sound carrier therein responsive to reception of said vestigial sideband amplitude-modulation analog television signal to condition said multiplexer to selectively apply said first digitized baseband signal to the input port of said adaptive digital filter circuitry as its input signal.

11. The television signal reception apparatus of claim 10, wherein said received digital television signal received during said second times is one transmitted by vestigial sideband amplitude-modulation accompanied by a pilot subcarrier, said television signal reception apparatus further comprising:

a pilot subcarrier detector connected for sensing the substantial presence of said pilot subcarrier accompanying said digital television signal being received to condition said multiplexer to selectively apply said second digitized baseband signal to the input port of said adaptive digital filter circuitry as its input signal.

12. The television signal reception apparatus of claim 10, wherein said received digital television signal received during said second times is one transmitted by vestigial sideband amplitude-modulation accompanied by a data field synchronizing signal, said television signal reception apparatus further comprising:

circuitry, responsive to the presence of a prescribed portion of the data field synchronizing signal in said digital television signal being received, for conditioning said multiplexer to selectively apply said second digitized baseband signal to the input port of said adaptive digital filter circuitry as its input signal.

13. The television signal reception apparatus of claim 9 wherein said digital television signal received during said second times is one transmitted by vestigial sideband amplitude-modulation.

14. The television signal reception apparatus of claim 13 further comprising:

a receiver portion for supplying third digitized baseband signal responsive to a quadrature-amplitude-modulation digital television signal received during third times, with said adaptive digital filter circuitry being connected for suppressing ghosts in said third digitized baseband signal during said third times.

15. The television signal reception apparatus for receiving a television signal selected from among digital television and analog television signals, said television signal reception apparatus, comprising:

a receiver portion for supplying first digitized baseband signal responsive to a vestigial sideband amplitude-modulation analog television signal received during first times;

a receiver portion for supplying second digitized baseband signal responsive to a digital television signal received during second times;

adaptive digital filter circuitry with input and output ports and with programmable filtering weights, connected for adaptive operation during said first times for suppressing ghosts in said first digitized baseband signal, and connected for adaptive operation during said second times for suppressing ghosts in said second digitized baseband signal;

a receiver portion for supplying third digitized baseband signal responsive to a quadrature-amplitude-modulation digital television signal received during third times, with said adaptive digital filter circuitry being connected for suppressing ghosts in said third digitized baseband signal during said third times;

a multiplexer for selectively applying said first digitized baseband signal to the input port of said adaptive digital filter circuitry during said first times, for selectively applying said second digitized baseband signal to the input port of said adaptive digital filter circuitry during said second times, and for selectively applying said third digitized baseband signal to the input port of said adaptive digital filter circuitry during said third times;

an intercarrier sound carrier detector connected to said analog television signal receiver portion for selectively conditioning said multiplexer to apply said first digitized baseband signal to the input port of said adaptive digital filter circuitry as its input signal, responsive to the generation of intercarrier sound carrier within said intercarrier sound carrier detector during reception of said vestigial sideband amplitude-modulation analog television signal; and a pilot subcarrier detector connected for sensing the substantial presence of said pilot subcarrier accompanying said digital television signal being received to condition said multiplexer to selectively apply said second digitized baseband signal to the input port of said adaptive digital filter circuitry as its input signal wherein said digital television signal received during said second times is one transmitted by vestigial sideband amplitude-modulation.

16. The television signal reception apparatus of claim 15 further comprising:

a threshold detector connected to said receiver portion for supplying third digitized baseband signal for responding to automatic gain control being applied to said receiver portion for supplying third digitized baseband signal to condition said multiplexer to selectively apply said third digitized baseband signal to the input port of said adaptive digital filter circuitry as its input signal.

17. A television signal reception apparatus for receiving a television signal selected from among digital television and analog television signals, said television signal reception apparatus, comprising:

a receiver portion for supplying first digitized baseband signal responsive to a vestigial sideband amplitude-modulation analog television signal received during first times;

a receiver portion for supplying second digitized baseband signal responsive to a digital television signal received during second times;

adaptive digital filter circuitry with input and output ports and with programmable filtering weights, connected for adaptive operation during said first times for suppressing ghosts in said first digitized baseband signal, and connected for adaptive operation during said second times for suppressing ghosts in said second digitized baseband signal.

a receiver portion for supplying third digitized baseband signal responsive to a quadrature-amplitude-modulation digital television signal received during third times, with said adaptive digital filter circuitry being connected for suppressing ghosts in said third digitized baseband signal during said third times;

a multiplexer for selectively applying said first digitized baseband signal to the input port of said adaptive digital filter circuitry during said first times, for selectively applying said second digitized baseband signal to the input port of said adaptive digital filter circuitry during said second times, and for selectively applying said third digitized baseband signal to the input port of said adaptive digital filter circuitry during said third times;

an intercarrier sound carrier detector connected to said analog television signal receiver portion for selectively conditioning said multiplexer to apply said first digitized baseband signal to the input port of said adaptive digital filter circuitry as its input signal, responsive to the generation of intercarrier sound carrier within said intercarrier sound carrier detector during reception of said vestigial sideband amplitude-modulation analog television signal; and circuitry, responsive to the presence of a prescribed portion of the data field synchronizing signal in said digital television signal being received, for conditioning said multiplexer to selectively apply said second digitized baseband signal to the input port of said adaptive digital filter circuitry as its input signal;

wherein said digital television signal received during said second times is one transmitted by vestigial sideband amplitude-modulation.

18. The television signal reception apparatus of claim 17 further comprising:

a threshold detector connected to said receiver portion for supplying third digitized baseband signal for responding to automatic gain control being applied to said receiver portion for supplying third digitized baseband signal to condition said multiplexer to selectively apply said third digitized baseband signal to the input port of said adaptive digital filter circuitry as its input signal.

19. The television signal reception apparatus of claim 9 wherein said digital television signal received during said second times is one transmitted by quadrature-amplitude-modulation.

20. A television signal reception apparatus for receiving a television signal selected from digital television signals transmitted by vestigial sideband amplitude-modulation and digital television signals transmitted by quadrature-amplitude-modulation, said television signal reception apparatus comprising:

a receiver portion for supplying first digitized baseband signal responsive to a vestigial sideband amplitude-modulation digital television signal received during first times;

a receiver portion for supplying second digitized baseband signal responsive to a quadrature-amplitude-modulation digital television signal received during second times; and adaptive digital filter circuitry with programmable filtering weights, connected for adaptive operation during said first times for suppressing ghosts in said first digitized baseband signal based upon a first ghost cancellation reference signal extracted from said first digitized baseband signal, and connected for adaptive operation during said second times for suppressing ghosts in said second digitized baseband signal based upon a second ghost cancellation reference signal extracted from said second digitized baseband signal.

21. The television signal reception apparatus of claim 20, wherein said vestigial sideband amplitude-modulation digital television signal received during said first times is accompanied by a pilot subcarrier, said television signal reception apparatus further comprising:

a multiplexer for selectively applying said first digitized baseband signal to the input port of said adaptive digital filter circuitry during said first times and for selectively applying said second digitized baseband signal to the input port of said adaptive digital filter circuitry during said second times; and a pilot subcarrier detector connected for sensing the substantial presence of said pilot subearrier accompanying said digital television signal being received to condition said multiplexer to selectively apply said first digitized baseband signal to the input port of said adaptive digital filter circuitry as its input signal.

22. The television signal reception apparatus of claim 20, wherein said vestigial sideband amplitude-modulation digital television signal received during said first times is accompanied by a data field synchronizing signal, said television signal reception apparatus further comprising:

a multiplexer for selectively applying said first digitized baseband signal to the input port of said adaptive digital filter circuitry during said first times and for selectively applying said second digitized baseband signal to the input port of said adaptive digital filter circuitry during said second times; and circuitry, responsive to the presence of a prescribed portion of the data field synchronizing signal in said digital television signal being received, for conditioning said multiplexer to selectively apply said first digitized baseband signal to the input port of said adaptive digital filter circuitry as its input signal.

* * * * *